(12) United States Patent
Park et al.

(10) Patent No.: US 12,446,618 B2
(45) Date of Patent: Oct. 21, 2025

(54) AEROSOL GENERATING DEVICE FOR DISCHARGING VAPOR THAT IS VISUALLY DIFFERENT ACCORDING TO MODE

(71) Applicant: KT&G CORPORATION, Daejeon (KR)

(72) Inventors: In Su Park, Seoul (KR); John Tae Lee, Daejeon (KR); Sung Jong Ki, Daejeon (KR); Eun Mi Jeoung, Daejeon (KR); Young Joong Kim, Daejeon (KR); Sun Hwan Jung, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 575 days.

(21) Appl. No.: 17/262,355

(22) PCT Filed: Sep. 11, 2020

(86) PCT No.: PCT/KR2020/012311
§ 371 (c)(1),
(2) Date: Sep. 12, 2022

(87) PCT Pub. No.: WO2021/132846
PCT Pub. Date: Jul. 1, 2021

(65) Prior Publication Data
US 2022/0408804 A1    Dec. 29, 2022

(30) Foreign Application Priority Data
Dec. 27, 2019  (KR) .................. 10-2019-0175934

(51) Int. Cl.
A24F 40/30       (2020.01)
A24B 15/167      (2020.01)
(Continued)

(52) U.S. Cl.
CPC ............ *A24F 40/30* (2020.01); *A24B 15/167* (2016.11); *A24F 40/10* (2020.01); *A24F 40/20* (2020.01);
(Continued)

(58) Field of Classification Search
None
See application file for complete search history.

(56) References Cited

U.S. PATENT DOCUMENTS

| 2013/0014772 A1* | 1/2013 | Liu ........................ A24F 40/30 131/329 |
| 2016/0022930 A1 | 1/2016 | Greim et al. |

(Continued)

FOREIGN PATENT DOCUMENTS

| CN | 106572705 A | 4/2017 |
| CN | 108778007 A | 11/2018 |

(Continued)

OTHER PUBLICATIONS

Chinese Office Action dated Nov. 2, 2023 in Chinese Application No. 202080004932.7.

(Continued)

*Primary Examiner* — Katherine A Will
(74) *Attorney, Agent, or Firm* — Sughrue Mion, PLLC

(57) ABSTRACT

Provided are an aerosol generating device, which discharges visible vapor in a first smoking mode and invisible vapor in a second smoking mode, and an operation method of the aerosol generating device.

3 Claims, 7 Drawing Sheets

(51) Int. Cl.
    *A24F 40/10*    (2020.01)
    *A24F 40/20*    (2020.01)
    *A24F 40/42*    (2020.01)
    *A24F 40/46*    (2020.01)
    *A24F 40/465*   (2020.01)
    *A24F 40/57*    (2020.01)
    *A24F 40/60*    (2020.01)

(52) U.S. Cl.
    CPC .............. *A24F 40/42* (2020.01); *A24F 40/46* (2020.01); *A24F 40/465* (2020.01); *A24F 40/57* (2020.01); *A24F 40/60* (2020.01)

(56) References Cited

U.S. PATENT DOCUMENTS

| | | |
|---|---|---|
| 2017/0086500 A1* | 3/2017 | Li .................... A24B 15/16 |
| 2017/0119058 A1 | 5/2017 | Cameron |
| 2017/0238610 A1 | 8/2017 | Reevell |
| 2017/0280769 A1 | 10/2017 | Li et al. |
| 2018/0035719 A1 | 2/2018 | Turner et al. |
| 2018/0168227 A1 | 6/2018 | Fraser et al. |
| 2018/0220712 A1 | 8/2018 | Hopps |
| 2019/0124982 A1 | 5/2019 | Atkins et al. |
| 2019/0357596 A1 | 11/2019 | Blick et al. |
| 2022/0061131 A1 | 2/2022 | Sears et al. |

FOREIGN PATENT DOCUMENTS

| | | |
|---|---|---|
| CN | 109310157 A | 2/2019 |
| JP | 2019-513374 A | 5/2019 |
| KR | 10-2018-0115681 A | 10/2018 |
| WO | 02/051468 A1 | 7/2002 |
| WO | 2014/085719 A1 | 6/2014 |
| WO | 2015/120623 A1 | 8/2015 |
| WO | 2017/185051 A1 | 10/2017 |
| WO | 2019/016535 A1 | 1/2019 |
| WO | 2019/041481 A1 | 3/2019 |

OTHER PUBLICATIONS

Communication dated Apr. 26, 2022 from the Japanese Patent Office in Application No. 2021-502497.

Extended European Search Report issued Oct. 21, 2021 in European Application No. 20841843.4.

International Search Report for PCT/KR2020/012311, dated Dec. 18, 2020.

Office Action dated Mar. 29, 2023 from the Chinese Patent Office in Application No. 202080004932.7.

Communication issued May 22, 2024 in European Application No. 20 841 843.4.

* cited by examiner

AEROSOL GENERATING DEVICE FOR DISCHARGING VAPOR THAT IS VISUALLY DIFFERENT ACCORDING TO MODE

CROSS REFERENCE TO RELATED APPLICATIONS

This application is a National Stage of International Application No. PCT/KR2020/012311 filed Sep. 11, 2020, claiming priority based on Korean Patent Application No. 10-2019-0175934 filed Dec. 27, 2019.

TECHNICAL FIELD

The present disclosure relates to an aerosol generating device for discharging visually different vapors, according to a mode.

BACKGROUND ART

Recently, the demand for alternative methods to overcome the disadvantages of traditional cigarettes has increased. For example, there is growing demand for an aerosol generating device which generates aerosol by heating an aerosol generating material in cigarettes, rather than by combusting cigarettes. Accordingly, researches on a heating-type cigarette or a heating-type aerosol generating device have been actively conducted.

DESCRIPTION OF EMBODIMENTS

Technical Problem

The present disclosure provides an aerosol generating device for discharging vapors that are visually different, according to a mode, and an aerosol generating method.

The technical problems of the present disclosure are not limited to the above-described description, and other technical problems may be derived from the embodiments to be described hereinafter.

Solution to Problem

According to an aspect of the present disclosure, an aerosol generating device includes a battery, a first cartridge including a first material including nicotine and a first heater configured to heat the first material, a second cartridge including a second material including an aerosol-forming agent and a second heater configured to heat the second material, and a controller configured to control power supplied to the first heater and the second heater from the battery, according to a smoking mode, wherein the controller is configured to control the power, which is supplied to the first heater and the second heater, to allow the first material and the second material to be heated in a first smoking mode and control the power, which is supplied to the first heater and the second heater, to allow the first material to be heated and not allow the second material to be heated in a second smoking mode.

According to another aspect of the present disclosure, an operation method of an aerosol generating device includes selecting, from among first and second smoking modes, a smoking mode in which the aerosol generating device operates, controlling power, which is supplied to a first heater and a second heater, to allow a first material including nicotine to be heated by the first heater and a second material including an aerosol-forming agent to be heated by the second heater, when the first smoking mode is selected, and controlling the power, which is supplied to a first heater and a second heater, to allow the first material to be heated by the first heater and not allow the second material to be heated by the second heater, when the second smoking mode is selected.

According to another aspect of the present disclosure, an operation method of an aerosol generating device includes selecting, from among first and second smoking modes, a smoking mode in which the aerosol generating device operates, controlling the aerosol generating device to discharge visible vapor when the first smoking mode is selected, and controlling the aerosol generating device to discharge invisible vapor when the second smoking mode is selected.

Advantageous Effects of Disclosure

A user may control an aerosol generating device to discharge invisible vapor according to a situation.

Effects of the present disclosure are not limited to the above description, and various effects are described in the present specification.

BEST MODE

Figure 1:
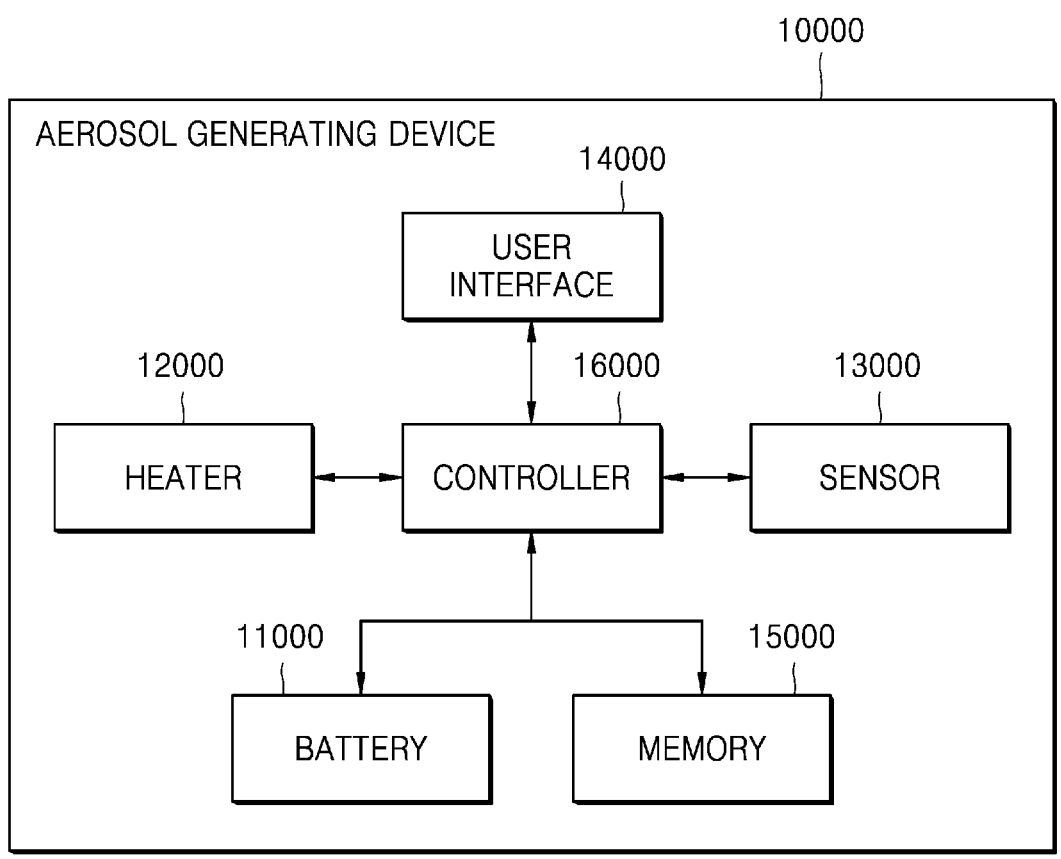
FIG. 1 is a block diagram illustrating hardware components of an aerosol generating device according to an embodiment.

According to an aspect of the present disclosure, an aerosol generating device includes a battery, a first cartridge including a first material including nicotine and a first heater configured to heat the first material, a second cartridge including a second material including an aerosol-forming agent and a second heater configured to heat the second material, and a controller configured to control power supplied to the first heater and the second heater from the battery, according to a smoking mode, wherein the controller is configured to control the power, which is supplied to the first heater and the second heater, to allow the first material and the second material to be heated in a first smoking mode and control the power, which is supplied to the first heater and the second heater, to allow the first material to be heated and not allow the second material to be heated in a second smoking mode.

Visually different vapors may be discharged, in the first smoking mode and the second smoking mode.

Visible vapor may be discharged in the first smoking mode, and invisible vapor may be discharged in the second smoking mode.

The first material may be a solid material, and the second material may be a liquid material.

In the first smoking mode, vapor, which is generated in the second cartridge, may be provided with nicotine by passing through the first cartridge and may be discharged to the outside of the aerosol generating device.

The aerosol generating device may further include a user interface, and the controller may be configured to select, from among the first and second smoking modes, a smoking mode in which the aerosol generating device may operate, according to a user command input through the user interface.

The first material may further include a pH adjuster.

According to another aspect of the present disclosure, an operation method of an aerosol generating device, includes selecting, from among first and second smoking modes, a smoking mode in which the aerosol generating device operates, controlling power, which is supplied to a first heater and a second heater, to allow a first material including nicotine to be heated by the first heater and a second material including an aerosol-forming agent to be heated by the second heater, when the first smoking mode is selected, and controlling the power, which is supplied to a first heater and a second heater, to allow the first material to be heated by the first heater and not allow the second material to be heated by the second heater, when the second smoking mode is selected.

According to another aspect of the present disclosure, an operation method of an aerosol generating device, includes selecting, from among first and second smoking modes, a smoking mode in which the aerosol generating device operates, controlling the aerosol generating device to discharge visible vapor when the first smoking mode is selected, and controlling the aerosol generating device to discharge invisible vapor when the second smoking mode is selected.

MODE OF DISCLOSURE

With respect to the terms used to describe in the various embodiments, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

FIG. 1 is a block diagram illustrating hardware components of the aerosol generating device according to an embodiment.

Referring to FIG. 1, the aerosol generating device 10000 may include a battery 11000, a heater 12000, a sensor 13000, a user interface 14000, a memory 15000, and a controller 16000. However, the internal structure of the aerosol generating device 10000 is not limited to the structures illustrated in FIG. 1. According to the design of the aerosol generating device 10000, it will be understood by one of ordinary skill in the art that some of the hardware components shown in FIG. 4 may be omitted or new components may be added.

In an embodiment, the aerosol generating device 10000 may consist of only a main body, in which case hardware components included in the aerosol generating device 10000 are located in the main body. In another embodiment, the aerosol generating device 10000 may consist of a main body and a cartridge, in which case hardware components included in the aerosol generating device 10000 are located separately in the main body and the cartridge. Alternatively, at least some of hardware components included in the aerosol generating device 10000 may be located respectively in the main body and the cartridge.

Hereinafter, an operation of each of the components will be described without being limited to the location in a particular space in the aerosol generating device 10000.

The battery 11000 supplies power to be used for the aerosol generating device 10000 to operate. In other words, the battery 11000 may supply power such that the heater 12000 may be heated. In addition, the battery 11000 may supply power required for operation of other hardware components included in the aerosol generating device 10000, that is, the sensor 13000, the user interface 14000, the memory 15000, and the controller 16000. The battery 11000 may be a rechargeable battery or a disposable battery. For example, the battery 11000 may be a lithium polymer (LiPoly) battery, but is not limited thereto.

The heater 12000 receives power from the battery 11000 under the control of the controller 16000. The heater 12000 may receive power from the battery 11000 and heat a cigarette inserted into the aerosol generating device 10000, or heat the cartridge mounted on the aerosol generating device 10000.

The heater 12000 may be located in the main body of the aerosol generating device 10000. Alternatively, when the aerosol generating device 10000 consists of the main body and the cartridge, the heater 12000 may be located in the cartridge. When the heater 12000 is located in the cartridge, the heater 12000 may receive power from the battery 11000 located in at least one of the main body and the cartridge.

The heater 12000 may be formed of any suitable electrically resistive material. For example, the suitable electrically resistive material may be a metal or a metal alloy including titanium, zirconium, tantalum, platinum, nickel, cobalt, chromium, hafnium, niobium, molybdenum, tungsten, tin, gallium, manganese, iron, copper, stainless steel, or nichrome, but is not limited thereto. In addition, the heater 12000 may be implemented by a metal wire, a metal plate on which an electrically conductive track is arranged, or a ceramic heating element, but is not limited thereto.

In an embodiment, the heater 12000 may be a component included in the cartridge. The cartridge may include the heater 12000, the liquid delivery element, and the liquid storage. The aerosol generating material accommodated in the liquid storage may be moved to the liquid delivery element, and the heater 12000 may heat the aerosol generating material absorbed by the liquid delivery element, thereby generating aerosol. For example, the heater 12000 may include a material such as nickel chromium and may be wound around or arranged adjacent to the liquid delivery element.

In another embodiment, the heater 12000 may heat the cigarette inserted into the accommodation space of the aerosol generating device 10000. As the cigarette is accommodated in the accommodation space of the aerosol generating device 10000, the heater 12000 may be located inside and/or outside the cigarette. Accordingly, the heater 12000 may generate aerosol by heating the aerosol generating material in the cigarette.

Meanwhile, the heater 12000 may include an induction heater. The heater 12000 may include an electrically conductive coil for heating an aerosol generating article in an induction heating method, and the aerosol generating article or the cartridge may include a susceptor which may be heated by the induction heater.

The aerosol generating device 10000 may include at least one sensor 13000. A result sensed by the at least one sensor 13000 is transmitted to the controller 16000, and the controller 16000 may control the aerosol generating device 10000 to perform various functions such as controlling the operation of the heater, restricting smoking, determining whether a cigarette (or a cartridge) is inserted, and displaying a notification.

For example, the at least one sensor 13000 may include a puff detecting sensor. The puff detecting sensor may detect a user's puff based on any one of a temperature change, a flow change, a voltage change, and a pressure change.

In addition, the at least one sensor 13000 may include a temperature detecting sensor. The temperature detecting sensor may detect the temperature at which the heater 12000 (or an aerosol generating material) is heated. The aerosol generating device 10000 may include a separate temperature detecting sensor for sensing a temperature of the heater 12000, or the heater 12000 itself may serve as a temperature detecting sensor instead of including a separate temperature detecting sensor. Alternatively, a separate temperature detecting sensor may be further included in the aerosol generating device 10000 while the heater 12000 serves as a temperature detecting sensor.

In addition, the at least one sensor 13000 may include a position change detecting sensor. The position change detecting sensor may detect a change in a position of the main body.

The user interface 14000 may provide the user with information about the state of the aerosol generating device 10000. The user interface 14000 may include various interfacing devices, such as a display or a light emitter for outputting visual information, a motor for outputting haptic information, a speaker for outputting sound information, input/output (I/O) interfacing devices (e.g., a button or a touch screen) for receiving information input from the user or outputting information to the user, terminals for performing data communication or receiving charging power, and communication interfacing modules for performing wireless communication (e.g., Wi-Fi, Wi-Fi direct, Bluetooth, near-field communication (NFC), etc.) with external devices.

However, the aerosol generating device 10000 may be implemented by selecting only some of the above-described examples of various user interface 14000.

The memory 15000, as a hardware component configured to store various pieces of data processed in the aerosol generating device 10000, may store data processed or to be processed by the controller 16000. The memory 15000 may include various types of memories; random access memory (RAM), such as dynamic random access memory (DRAM) and static random access memory (SRAM), etc.; read-only memory (ROM); electrically erasable programmable read-only memory (EEPROM), etc.

The memory 15000 may store an operation time of the aerosol generating device 10000, the maximum number of puffs, the current number of puffs, at least one temperature profile, data on a user's smoking pattern, etc.

The controller 16000 may generally control operations of the aerosol generating device 10000. The controller 16000 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The controller 16000 analyzes a result of the sensing by at least one sensor 13000, and controls the processes that are to be performed subsequently.

The controller 16000 may control power supplied to the heater 12000 so that the operation of the heater 12000 is started or terminated, based on the result of the sensing by the at least one sensor 13000. In addition, based on the result of the sensing by the at least one sensor 13000, the controller 16000 may control the amount of power supplied to the heater 12000 and the time at which the power is supplied, so that the heater 12000 is heated to a predetermined temperature or maintained at an appropriate temperature.

In an embodiment, the controller 16000 may set a mode of the heater 12000 to a pre-heating mode to start the operation of the heater 12000 after receiving a user input to the aerosol generating device 10000. In addition, the controller 16000 may switch the mode of the heater 12000 from the pre-heating mode to an operation mode after detecting a user's puff by using the puff detecting sensor. In addition, the controller 16000 may stop supplying power to the heater 12000 when the number of puffs reaches a preset number after counting the number of puffs by using the puff detecting sensor.

The controller 16000 may control the user interface 14000 based on the result of the sensing by the at least one sensor 13000. For example, when the number of puffs reaches the preset number after counting the number of puffs by using the puff detecting sensor, the controller 16000 may notify the user by using at least one of a light emitter, a motor, or a speaker that the aerosol generating device 10000 will soon be terminated.

Although not illustrated in FIG. 1, the aerosol generating device 10000 may form an aerosol generating system together with an additional cradle. For example, the cradle may be used to charge the battery 11000 of the aerosol generating device 10000. For example, while the aerosol generating device 10000 is accommodated in an accommodation space of the cradle, the aerosol generating device 10000 may receive power from a battery of the cradle such that the battery 11000 of the aerosol generating device 10000 may be charged.

Figure 2:
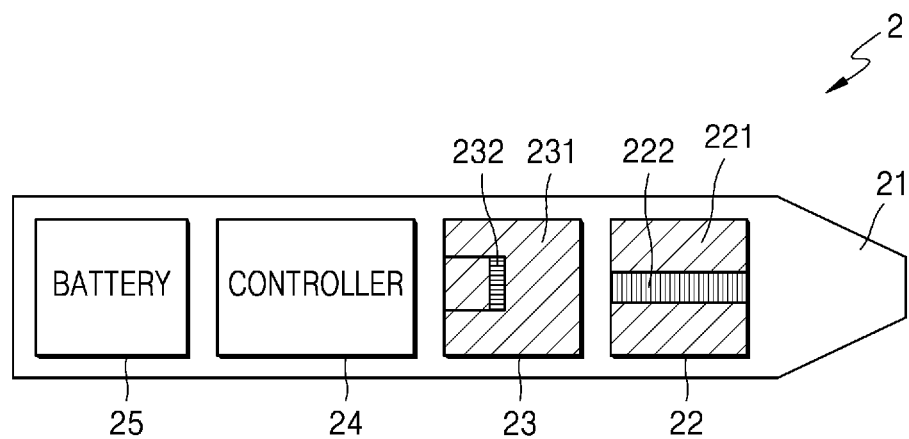
FIG. 2 illustrates an example of an aerosol generating device.

FIG. 2 illustrates an example of an aerosol generating device.

An aerosol generating device 2 may include a mouthpiece 21, a first cartridge 22, a second cartridge 23, a controller 24, and a battery 25.

FIG. 2 illustrates that the first cartridge 22, the second cartridge 23, the controller 24, and the battery 25 may be arranged in parallel, but may be differently arranged. For example, the first cartridge 22 and the second cartridge 23 may be arranged in parallel, whereas the controller 24 and the battery 25 may be arranged in series.

The first cartridge 22 and the second cartridge 23 may be detachably coupled to the aerosol generating device 2. The first cartridge 22 and the second cartridge 23 may be either disposable or reusable. The first cartridge 22 may be integrally formed with the second cartridge 23 or may be separated therefrom.

The first cartridge 22 may include a first material 221 and a first heater 222 heating the first material 221.

The first material 221 may be a solid material including nicotine. The first material 221 may include a tobacco. For example, the first material 221 may include a granular tobacco, a pipe tobacco, a reconstituted tobacco, and the like. Because the first material 221 is a solid material, vapor, which is generated when the first material 221 is heated, may not be visible, compared to when the first material 221 is liquid. Unlike the above description, the first material 221 may be a liquid material including nicotine.

The first material 221 may selectively include an aerosol-forming agent. For example, the aerosol-forming agent may include at least one of glycerin, propylene glycol, ethylene glycol, dipropylene glycol, diethylene glycol, triethylene glycol, tetraethylene glycol, and oleyl alcohol, but it is not limited thereto. A tract of the aerosol-forming agent of the first material 221 may be required to manufacture a first material without being broken, while the first material is manufactured by using a tobacco. Selectively, the first material 221 may include other additives, such as flavors, a wetting agent, and/or organic acid. The first material 221 may include a flavored liquid, such as menthol or a moisturizer, which is injected to the first material 221.

Selectively, the first material 221 may include a pH adjuster. For example, the pH adjuster may include at least any one of potassium carbonate ($K_2CO_3$), sodium bicarbonate ($NaHCO_3$), potassium hydroxide (KOH), sodium carbonate ($Na_2CO_3$), and calcium oxide (CaO). As the first material 221 includes the pH adjuster, nicotine and a tobacco flavor may be provided to the user even though the first material 221 is heated at a temperature less than or equal to 130° C.

The content of the pH adjuster in the first material 221 may be less than or equal to 10 wt %. Because the first material 221 is heated by the first heater 222, although the content of the pH adjuster is less than or equal to 10 wt %, the nicotine and tobacco flavor may be sufficiently provided to the user.

The cartridge 22 may include an accommodation space extending in a lengthwise direction of the aerosol generating device 2. The first material 221 may be accommodated in the accommodation space of the first cartridge 22.

The first heater 222 may be disposed inside or outside the first material 221. For example, the heater 222 may be disposed at the center of the first cartridge 22, and the first material 221 may surround at least a portion of the heater 222. As another example, the first material 221 may be disposed at the center of the first cartridge 22, and the heater 222 may surround at least a portion of the first material 221.

The first heater 222 may extend in the lengthwise direction of the aerosol generating device 2. As the first heater 222 extends in the lengthwise direction of the aerosol generating device 2, the first material 221 may be uniformly heated in the lengthwise direction of the aerosol generating device 2.

Alternatively, the first heater 222 may be a mesh heater and may be disposed on one surface of the first cartridge 22. The first heater 222 may form one surface of the first cartridge 22 and thus may prevent a discharge of the first material 221 to the outside of the first cartridge 22. For example, as illustrated in FIG. 2, the first heater 222 may be disposed on a surface of the first cartridge 22 that faces the second cartridge 23.

The first heater 222 may heat the first material 221 by receiving power from the battery 25 under the control of the controller 24. The first heater 222 may heat the first material 221 at a temperature that is sufficient enough to make the nicotine in the first material 221 be provided to the user. For example, when the first material 221 does not include the pH adjuster, the first heater 222 may heat the first material 221 at a temperature greater than or equal to 130° C. As another example, when the first material 221 includes the pH adjuster, the first heater 222 may heat the first material 221 at a temperature less than or equal to 130° C.

The second cartridge 23 may include a second material 231 and a second heater 232 heating the second material 231.

The second material 231 may be a liquid material. Unlike the above description, the second material 231 may be in a solid state, a gaseous state, or a gel state. For example, the second material 231 may be a liquid including a tobacco-containing material having a volatile tobacco flavor component, or a liquid including a non-tobacco material.

For example, the second material 231 may include one component of water, solvents, ethanol, plant extracts, spices, flavorings, and vitamin mixtures, or a mixture of these components. The spices may include menthol, peppermint, spearmint oil, and various fruit-flavored ingredients, but are not limited thereto. The flavorings may include ingredients capable of providing various flavors or tastes to a user. Vitamin mixtures can be a mixture of at least one of vitamin A, vitamin B, vitamin C, and vitamin E, but are not limited thereto. In addition, the second material 231 may include an aerosol-forming agent such as glycerin and propylene glycol.

Selectively, the second material 231 may include any weight ratio of glycerin and propylene glycol solution to which nicotine salts are added. The second material 231 may include two or more types of nicotine salts. Nicotine salts may be formed by adding suitable acids, including organic or inorganic acids, to nicotine. Nicotine may be a naturally generated nicotine or synthetic nicotine and may have any suitable weight concentration relative to the total solution weight of the second material 231.

Acid for the formation of the nicotine salts may be appropriately selected in consideration of the rate of nicotine absorption in the blood, the operating temperature of the aerosol generating device 2, the flavor or savor, the solubility, or the like. For example, the acid for the formation of nicotine salts may be a single acid selected from the group consisting of benzoic acid, lactic acid, salicylic acid, lauric acid, sorbic acid, levulinic acid, pyruvic acid, formic acid, acetic acid, propionic acid, butyric acid, valeric acid, caproic acid, caprylic acid, capric acid, citric acid, myristic acid, palmitic acid, stearic acid, oleic acid, linoleic acid, linolenic acid, phenylacetic acid, tartaric acid, succinic acid, fumaric acid, gluconic acid, saccharic acid, malonic acid or malic acid, or a mixture of two or more acids selected from the group, but is not limited thereto.

The second heater 232 may heat the second material 231 by receiving power from the battery 25 under the control of the controller 24. The second heater 232 may heat the second material 231 at a temperature different from the temperature of the first heater 222. For example, the second heater 232 may heat the second material 231 at a temperature greater than the temperature of the first heater 222. As another example, the first heater 222 may heat the first material 221 at the temperature less than or equal to 130° C., whereas the second heater 232 may heat the second material 231 at a temperature greater than or equal to an evaporation point of glycerin and propylene glycol.

As air flows through the first cartridge 22 and the second cartridge 23, the air is provided with an aerosol generated in the cartridge 22 and nicotine generated in the second cartridge 23, and thus, vapor may be generated. The generated vapor may be discharged to the outside of the aerosol generating device 2 through the mouthpiece 21.

The air may pass through the second cartridge 23 after passing through the first cartridge 22. In detail, the vapor generated in the second cartridge 23 may be provided with nicotine by passing through the first cartridge 22 and may be discharged to the outside of the aerosol generating device 2.

Alternatively, when the first cartridge 22 and the second cartridge 23 are arranged in parallel, the air may pass through the first cartridge 22 and the second cartridge 23 in parallel. In detail, after the vapor generated in the first cartridge 22 is mixed with the vapor generated in the second cartridge 23, a vapor mixture may be discharged to the outside of the aerosol generating device 2.

The controller 24 may control power supplied to the first heater 222 and the second heater 232 from the battery 25, according to a smoking mode. The smoking mode may include a first smoking mode and a second smoking mode.

The controller 24 may control the power supplied to the first heater 222 and the second heater 232 such that visually different vapors may be discharged from the aerosol generating device 2 in the first smoking mode and the second smoking mode.

The controller 24 may control the power supplied to the first heater 222 and the second heater 232 to allow visible vapor to be discharged from the aerosol generating device 2 in the first smoking mode. In detail, the controller 24 may control the first heater 222 to heat the first material 221 and the second heater 232 to heat the second material 231 in the first smoking mode. Because the second material 231 includes the aerosol-forming agent such as glycerin and propylene glycol, an aerosol may be generated as the second material 231 is heated in the first smoking mode, and thus, visible vapor may be discharged from the aerosol generating device 2. Alternatively, when the second material 231 includes nicotine, the controller 24 may control the first heater 222 not to heat the first material 221 and the second heater 232 to heat the second material 231, and thus, the visible vapor may be discharged.

The controller 24 may control the power supplied to the first heater 222 and the second heater 232 to allow invisible vapor to be discharged from the aerosol generating device 2 in the second smoking mode. In detail, the controller 24 may control the first heater 222 to heat the first material 221 and the second heater 232 not to heat the second material 231 in the second smoking mode. When the first material 221 does not include the aerosol-forming agent such as glycerin and propylene glycol or includes a trace of the aerosol-forming agent, the first material 221 may only be heated in the second smoking mode, and thus, the invisible vapor may be discharged from the aerosol generating device 2.

The discharge of the invisible vapor from the aerosol generating device 2 may indicate that it is impossible to check, with the naked eye, whether vapor is discharged from the aerosol generating device 2. Alternatively, the discharge of the invisible vapor from the aerosol generating device 2 may indicate that a significantly small amount of vapor is discharged compared to the amount of vapor discharged from the aerosol generating device 2 in the first smoking mode.

Figure 3:
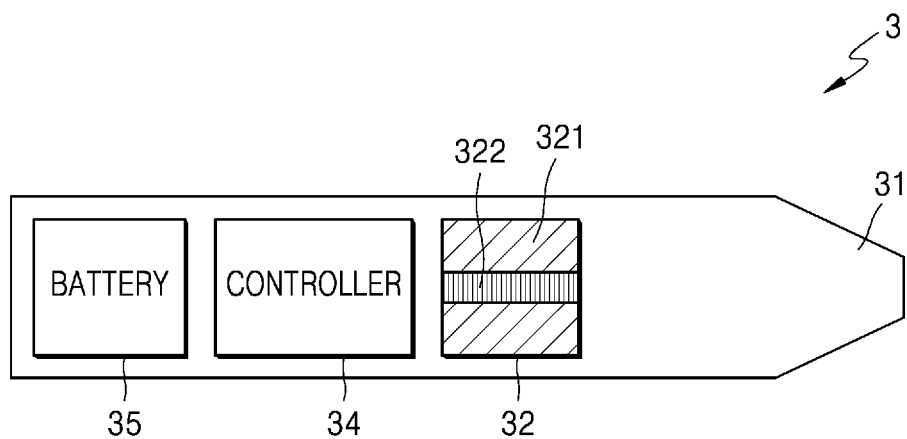
FIG. 3 illustrates an example of an aerosol generating device.

FIG. 3 illustrates an example of an aerosol generating device.

An aerosol generating device 3 may include a mouthpiece 31, a first cartridge 32, a controller 34, and a battery 35.

The first cartridge 32 may include a first material 321 and a first heater 322 heating the first material 321. The first heater 322 may heat the first material 321 by receiving power from the battery 35 under the control of the controller 34.

The first material 321 may be a solid material including nicotine. Alternatively, the first material 321 may be a liquid material including nicotine.

The first material 321 may include an aerosol-forming agent. Also, the first material 321 may include a pH adjuster. For example, the pH adjuster may include at least any one of $K_2CO_3$, $NaHCO_3$, KOH, $Na_2CO_3$ and CaO. Because the first material 321 includes the pH adjuster, nicotine and a tobacco flavor may be provided to the user even though the first material 321 is heated at a temperature less than or equal to 130° C.

Figure 4:
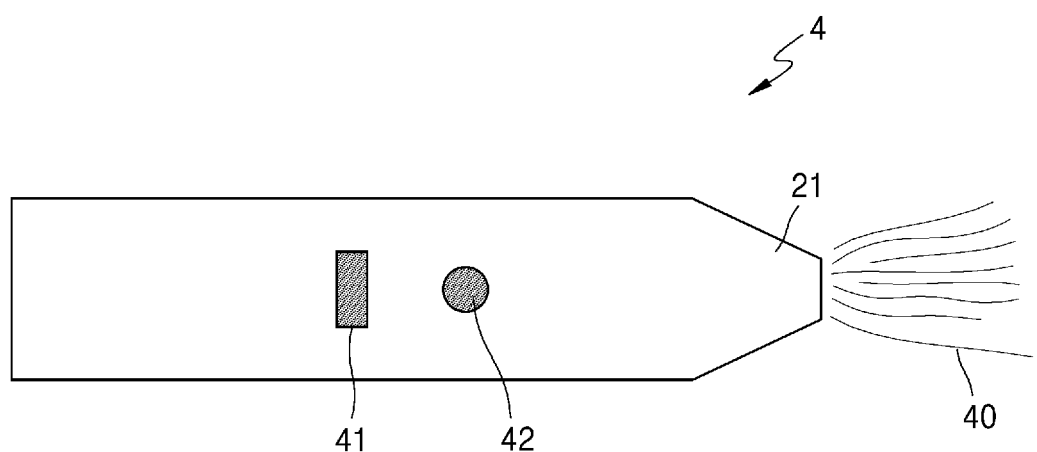
FIGS. 4 and 5 illustrate examples of vapor discharged from aerosol generating devices.
Figure 5:
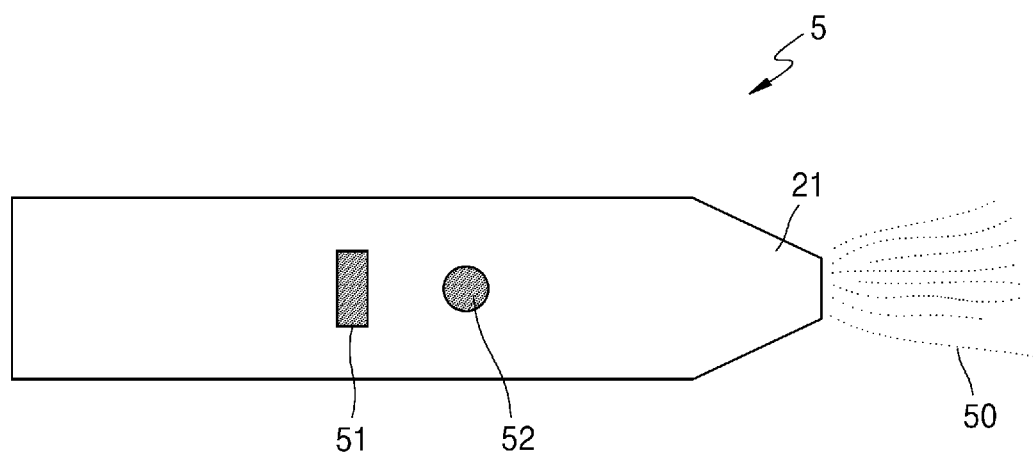

FIGS. 4 and 5 illustrate examples of vapor discharged from aerosol generating devices.

FIG. 4 illustrates an example in which visible vapor is discharged from an aerosol generating device, and FIG. 5 illustrates an example in which invisible vapor is discharged from an aerosol generating device.

Referring to FIGS. 4 and 5, aerosol generating devices 4 and 5 may discharge visually different vapors according to a smoking mode. The aerosol generating devices 4 and 5 may discharge visible vapor 40 in a first smoking mode and may discharge invisible vapor 50 in a second smoking mode.

Controllers of the aerosol generating devices 4 and 5 may select, from among the first and second smoking modes, a smoking mode in which the aerosol generating devices 4 and 5 may operate, according to user commands that are input through user interfaces 41 and 51. Current smoking modes of the aerosol generating devices 4 and 5 may be displayed on output elements 42 and 52 such as an LED and a display.

Figure 6:
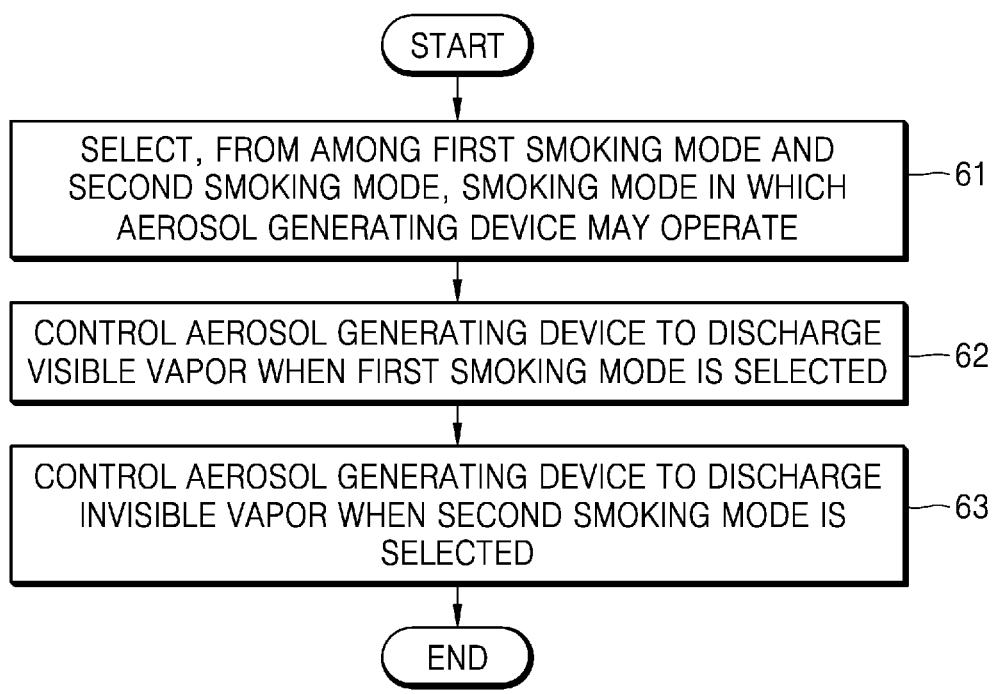
FIG. 6 is a flowchart of an example of an aerosol generating method.

FIG. 6 is a flowchart of an example of an aerosol generating method.

In operation 61, a controller of an aerosol generating device may select, from among first and second smoking modes, a smoking mode in which the aerosol generating device may operate. The controller may select the smoking mode in which the aerosol generating device may operate, according to a user command input through a user interface.

In operation 62, when the first smoking mode is selected, the controller of the aerosol generating device may control the aerosol generating device to discharge visible vapor. In detail, the controller may control a first heater to heat a first material including nicotine and a second heater to heat a second material including an aerosol-forming agent.

In operation 63, when the second smoking mode is selected, the controller of the aerosol generating device may control the aerosol generating device to discharge invisible vapor. In detail, the controller may control the first heater to heat the first material including nicotine and the second heater not to heat the second material including the aerosol-forming agent.

Figure 7:
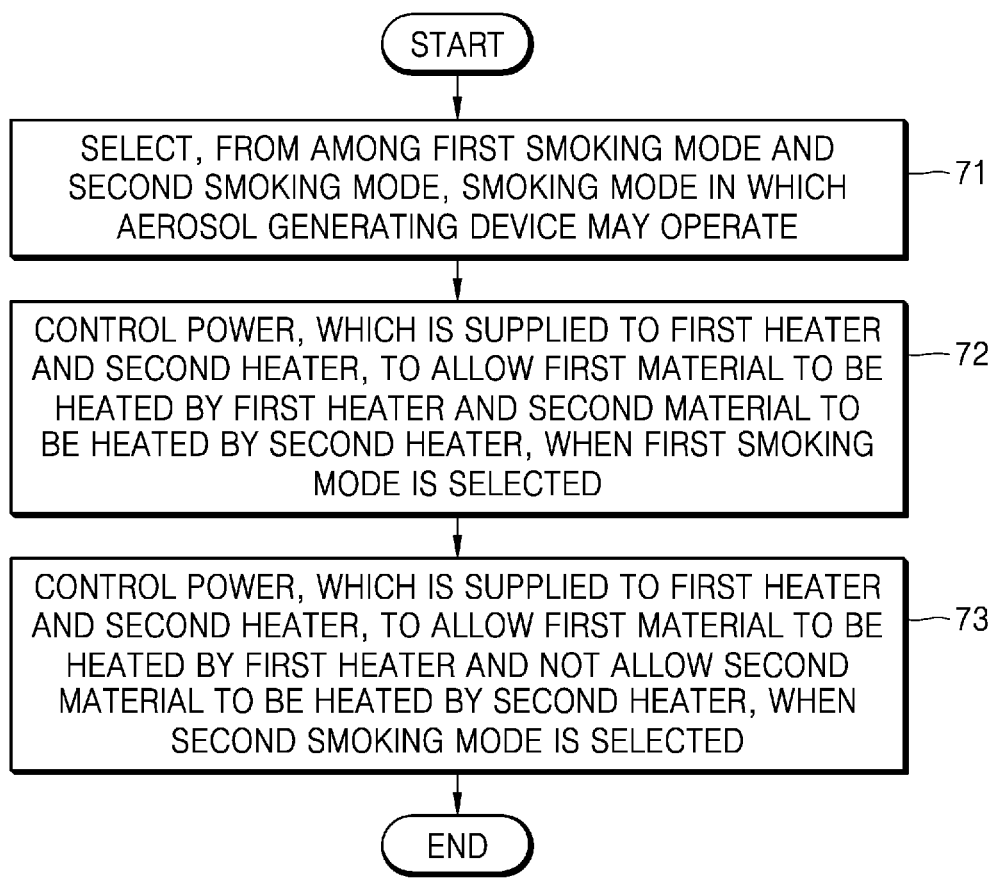
FIG. 7 is a flowchart of an example of an aerosol generating method.

FIG. 7 is a flowchart of an example of an aerosol generating method.

In operation 71, a controller of an aerosol generating device may select, from among first and second smoking modes, a smoking mode in which the aerosol generating device may operate. The controller may select the smoking mode in which the aerosol generating device may operate, according to a user command input through a user interface.

In operation 72, when the first smoking mode is selected, the controller of the aerosol generating device may control power supplied to first and second heaters to allow a first material to be heated by the first heater and a second material to be heated by the second heater. As the second material including an aerosol-forming agent is heated in the first smoking mode, visible vapor may be discharged.

In operation 73, when the second smoking mode is selected, the controller of the aerosol generating device may control the power supplied to the first heater and the second heater to allow the first material to be heated by the first heater and not allow the second material to be heated by the second heater. As the second material including the aerosol-forming agent is not heated in the second smoking mode, invisible vapor may be discharged.

The descriptions of the above-described embodiments are merely examples, and it will be understood by one of ordinary skill in the art that various changes and equivalents thereof may be made. Therefore, the scope of the disclosure should be defined by the appended claims, and all differences within the scope equivalent to those described in the claims will be construed as being included in the scope of protection defined by the claims.

The invention claimed is:

1. An aerosol generating device comprising:
   a battery;
   a first cartridge comprising a first material being a solid material, which comprises nicotine, and a first heater configured to heat the first material;
   a second cartridge comprising a second material being a liquid material, which comprises an aerosol-forming agent, and a second heater configured to heat the second material; and
   a controller configured to selectively control power supplied to the first heater and the second heater from the battery, according to a smoking mode,
   wherein the controller is configured to:
   control the power to allow the solid material and the liquid material to be heated in a first smoking mode to discharge a visible vapor, and control the power to allow only the solid material to be heated in a second smoking mode to discharge an invisible vapor,
   wherein the first heater is a mesh heater and is disposed on one surface of the first cartridge, and
   wherein, in the first smoking mode, vapor generated in the second cartridge is provided with nicotine by passing through the first cartridge and is discharged to the outside of the aerosol generating device.

2. The aerosol generating device of claim 1, further comprising a user interface,
   wherein the controller is configured to select, from among the first and second smoking modes, a smoking mode in which the aerosol generating device operates, according to a user command input through the user interface.

3. The aerosol generating device of claim 1, wherein the first material further comprises a pH adjuster.

* * * * *